United States Patent
Oliver et al.

(10) Patent No.: US 6,637,560 B2
(45) Date of Patent: Oct. 28, 2003

(54) VEHICLE DAMPER ASSEMBLY AND METHOD OF MODULATING FLUID FLOW

(75) Inventors: Michael L. Oliver, Xenia, OH (US); William C. Kruckemeyer, Beavercreek, OH (US); Todd A. Bishop, Centerville, OH (US); Eric L. Jensen, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/082,901

(22) Filed: Feb. 26, 2002

(65) Prior Publication Data

US 2003/0159897 A1 Aug. 28, 2003

(51) Int. Cl.[7] .................................................. F16F 9/00
(52) U.S. Cl. .................................................. 188/322.19
(58) Field of Search .............................. 188/267, 267.1, 188/267.2, 266.2, 266.7, 283, 286, 322.15, 322.18, 322.19, 322.22, 322.5; 267/140.14, 140.15

(56) References Cited

U.S. PATENT DOCUMENTS

| 3,321,210 A | * | 5/1967 | Delchev | ................. | 280/5.507 |
| 4,589,528 A | * | 5/1986 | Axthammer et al. | ..... | 188/266.2 |
| 4,819,772 A | * | 4/1989 | Rubel | ....................... | 188/267.1 |
| 5,259,487 A | * | 11/1993 | Petek | ....................... | 188/267.1 |
| 6,454,059 B1 | * | 9/2002 | Lonbani et al. | ............. | 188/267 |
| 6,464,049 B2 | * | 10/2002 | Lisenker | ..................... | 188/267 |
| 6,481,546 B2 | * | 11/2002 | Oliver et al. | ............ | 188/267.1 |
| 6,497,308 B2 | * | 12/2002 | Lisenker | .................. | 188/267.2 |

FOREIGN PATENT DOCUMENTS

JP          10-110769 A    *    4/1998

* cited by examiner

*Primary Examiner*—Pam Rodriguez
(74) *Attorney, Agent, or Firm*—Scott A. McBain

(57) ABSTRACT

The invention provides a vehicle damper assembly and a method for modulating fluid flow through the same. The assembly includes a housing including a fluid carried therein. A piston is slidably carried in the housing and includes a ring and a core. At least one gap to allow fluid flow is formed between the ring and core. A rod is operably attached to the piston. The ring moves axially with respect to the core to vary the gap size and modulate fluid flow during operation of the assembly. The method includes axially moving a ring with respect to a core during assembly operation. At least one gap size is varied based on the axial movement, wherein the gap is formed between the ring and core.

15 Claims, 3 Drawing Sheets

VEHICLE DAMPER ASSEMBLY AND METHOD OF MODULATING FLUID FLOW

TECHNICAL FIELD OF THE INVENTION

The present invention relates generally to vehicular suspension systems. More particularly, the invention relates to a vehicle damper assembly and method for modulating fluid flow.

BACKGROUND OF THE INVENTION

Linear suspension dampers, such as shock absorbers and McPherson struts, may include a rod and piston moving within a fluid-filled housing. Suspension movements transmitted to the rod and piston may be dampened as the damper compresses and extends. Desirable damper performance usually requires that significantly greater dampening force is generated during an extension stroke as compared to compression. The use of a magnetorheological (MR) fluid may be utilized to provide such dynamic dampening forces.

MR fluids are generally suspensions of magnetic particles such as iron or iron alloys in a fluid medium. The flow characteristics of these fluids can change by several orders of magnitude within milliseconds when subjected to a suitable magnetic field due to suspension of the particles. The ferromagnetic particles remain suspended under the influence of magnetic fields and applied forces. Such MR fluids are well known and have been found to have desirable electromagnetomechanical interactive properties for controlling dissipative forces along the damper's axis.

A linear acting MR damper piston may include a coil assembly, a core, and an annular piston ring positioned around the pole pieces to form an annular flow passage or gap. When the piston is displaced, MR fluid is forced through the gap from one area of the damper housing to another. When the coil is energized, a magnetic field permeates the gap and excites a transformation of the MR fluid to a state that exhibits increased damping force (i.e., the MR fluid viscosity is increased). Thus, the dampening force may be controlled by adjusting the current run through the coil assembly. In addition, this mechanism may be used to provide greater dampening force during the damper extension stroke.

Using MR state transformation to generate greater dampening force during extension may have disadvantages. For example, the ability of MR damper to manage finely-tuned dampening or other events may be diminished as a good deal of controllable dampening capacity is utilized to generate extension stroke dampening force. It would be desirable if the MR dampening capacity could be preserved to handle finely-tuned dampening and/or other events requiring additional dampening force. For dampers lacking MR fluid altogether, such dampers may not possess means for generating greater dampening force during the extension stroke. Accordingly, it would be desirable to provide a strategy for modulating the fluid flow through a damper piston thereby regulating the dampening force generated during extension and compression strokes.

Therefore, it would be desirable to provide a vehicle damper assembly and method for modulating fluid flow that overcomes the aforementioned and other disadvantages.

SUMMARY OF THE INVENTION

One aspect of the present invention provides a vehicle damper assembly. The assembly includes a housing including a fluid carried therein. A piston is slidably carried in the housing and includes a ring and a core. At least one gap to allow fluid flow is formed between the ring and core. A rod is operably attached to the piston. The ring moves axially with respect to the core to vary the gap size and modulate fluid flow during operation of the assembly. The fluid may be a magnetorheological fluid. The gap may be formed between at least one ring shoulder portion and at least one core shoulder portion. The gap may expand during a compression stroke and/or narrow during an extension stroke. The gap size may be inversely proportional to a dampening force. The piston may include a plurality of projections adapted to provide a limited range of motion relative to the core. At least one spring may be operably attached to the piston and adapted to force the ring against at least one of the projections.

Another aspect of the invention provides a method for modulating fluid flow through the vehicle damper assembly. The method includes axially moving a ring with respect to a core during assembly operation. At least one gap size is varied based on the axial movement, wherein the gap is formed between the ring and core. The gap may expand during a compression stroke and/or narrow during an extension stroke. The gap size may be inversely proportional to a dampening force. A ring range of motion relative to the core may be limited. The ring may be forced against at least one projection.

Another aspect of the invention provides a vehicle damper assembly. The assembly includes means for axially moving a piston ring with respect to a piston core during damper operation. The assembly further includes means for varying at least one gap size based on the axial movement, wherein the gap is formed between the ring and core.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
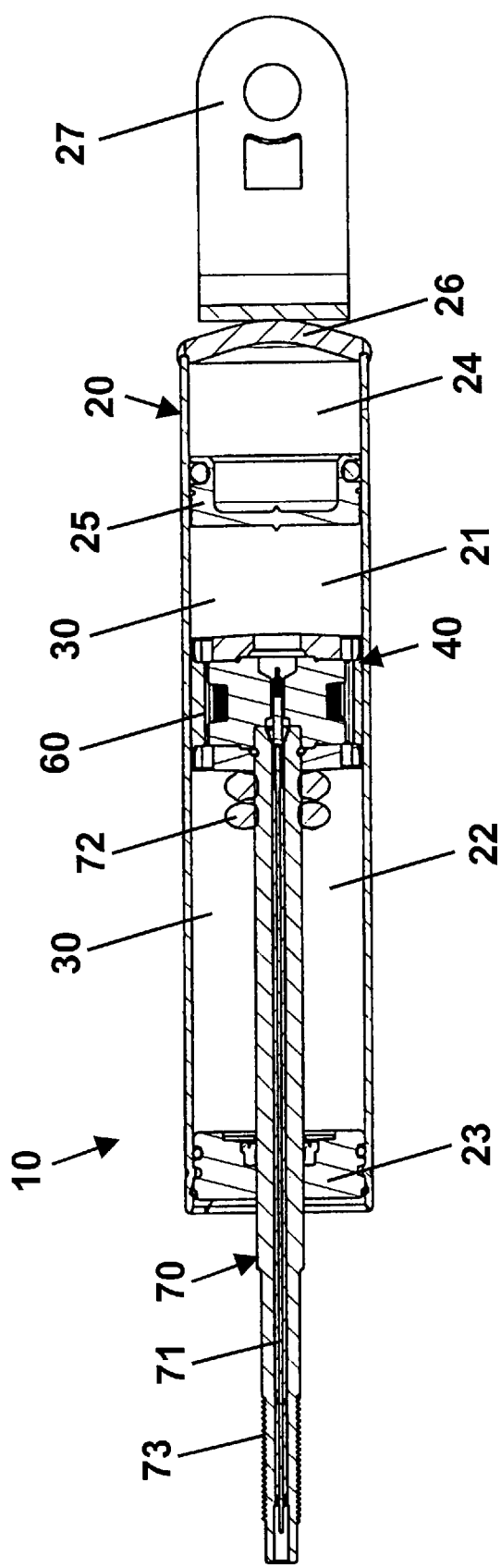
FIG. 1 is a cross-sectional view of a vehicle damper assembly made in accordance with the present invention.

Referring to the drawings, wherein like reference numerals refer to like elements, FIG. 1 is a cross-sectional view of a vehicle damper assembly made in accordance with the present invention and shown generally by numeral 10. Those skilled in the art will recognize that vehicle damper assembly 10 may include a number of alternate damper designs. For illustrative purpose, vehicle damper assembly 10 is shown and described as a linear acting fluid damper employing magnetic tuning with a magnetorheological (MR) fluid to effect desired damping level. Operation of the vehicle damper assembly 10, as described, includes compression and/or extension strokes experienced during typical damper usage.

Vehicle damper assembly 10 includes a housing 20 including a fluid 30 carried therein, a piston 40 slidably carried in housing 20, and a rod 70 operably attached to piston 40. Portions of the housing 20, piston 40, and rod 70 may be formed from a number of sufficiently rigid materials such as steel, aluminum, metal, metal alloy, composites, and the like. Fluid 30 may be forced to flow between a first 21 and second 22 housing compartment during damping events through at least one gap 60 formed in piston 40. Fluid 30 may be any number of fluids used for providing dampening force known in the art. In one embodiment, piston 40 may be formed from low-carbon steel with nickel plating and fluid 30 may be MR fluid. Low-carbon steel may provide electromagnetic induction properties compatible with MR fluid use.

An electrical conductor 71 may extend through rod 70 for providing electrical current to piston 40 from an external source (not shown). Rod 70 may include one or more bumpers 72 to limit piston 40 range of motion and "quiet" piston 40 contact with a second housing end portion 23 (e.g., during an extension stroke). Bumpers 72 may be formed from an elastomeric material compatible with fluid 30, such as a polyurethane material. Housing 20 may include a gas 24 contained by a cap 25 to provide a force against piston 40 as it travels toward a first housing end portion 26 (e.g., during a compression stroke). Housing 20 and rod 70 may include a wheel assembly attachment means 27 and a vehicle chassis attachment means 73, respectively.

Figure 2:
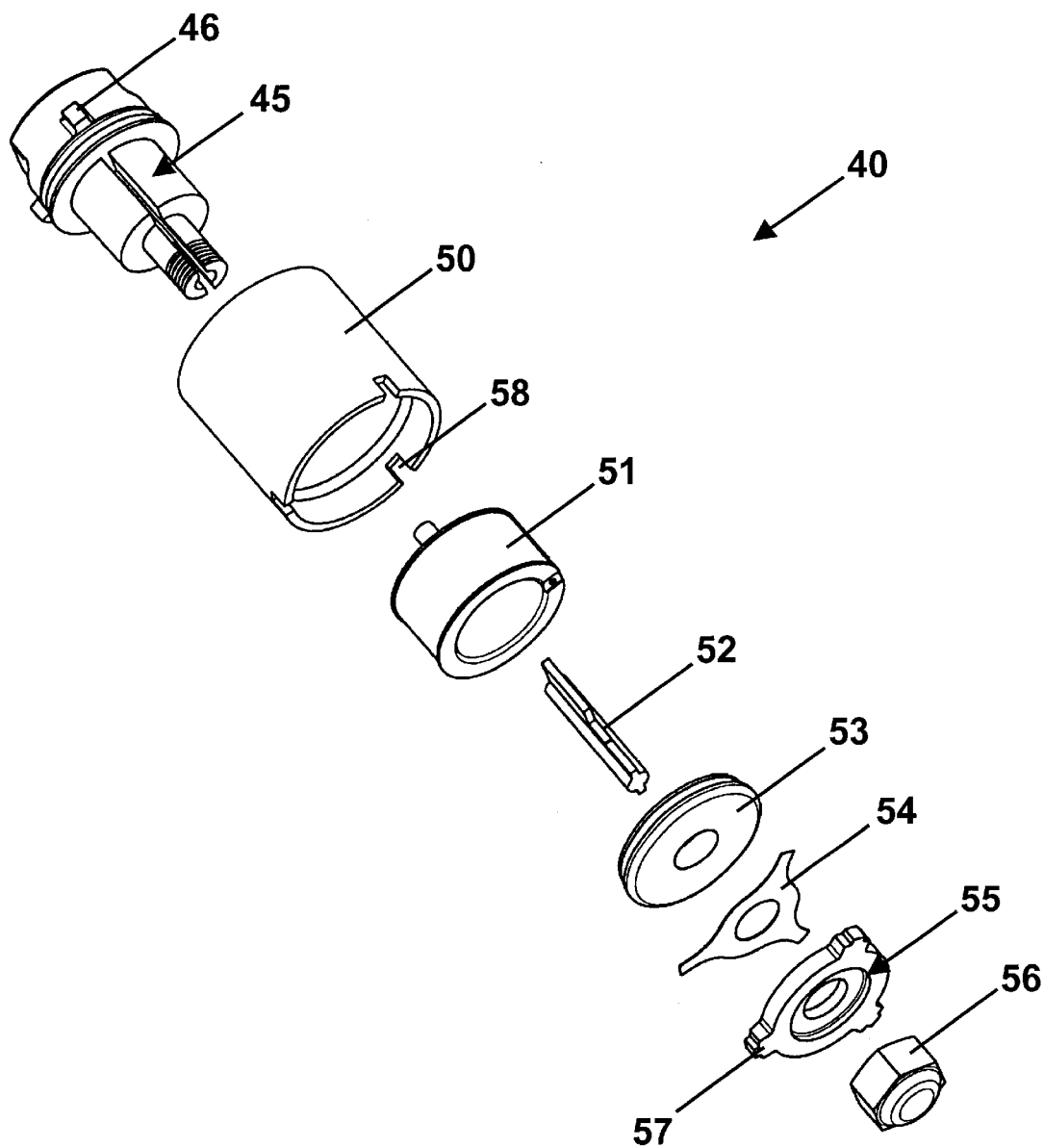
FIG. 2 is an exploded view of a piston made in accordance with the present invention.

FIG. 2 is an exploded view of a piston 40 made in accordance with the present invention. Piston 40 includes a core 45 adapted for operable attachment to rod 70. Core 45 and rod 70 may be attached with complementary threaded attachment or other attachment means. At least one core projection 46 may extend substantially radially from core 45. A ring 50 may be cylindrically shaped and form piston 40 exterior. A coil 51 may be positioned on core 45 (connections not shown). A filler 52 may support piston 40 structurally and enhance the magnetic circuit. An end plate 53, a spring 54, and an end ring 55 may be retained on core 45 with a threaded nut 56. At least one end ring projection 57 may extend substantially radially from end ring 55. Ring 50 radial motion may be fixed with respect to core 45. Ring 50 may move slidably in an axial direction with respect to the core 45 providing an axial ring 50 range of motion. Ring 50 axial range of motion may be limited at one piston 40 end by core projections 46, and at another piston 40 end by end ring projections 57. Spring 54 may apply a force on ring 50 to hold it against core projections 46. Alignment of spring 54 and end ring projections 57 may be maintained by corresponding slot(s) 58 formed in ring 50.

Figure 3A:
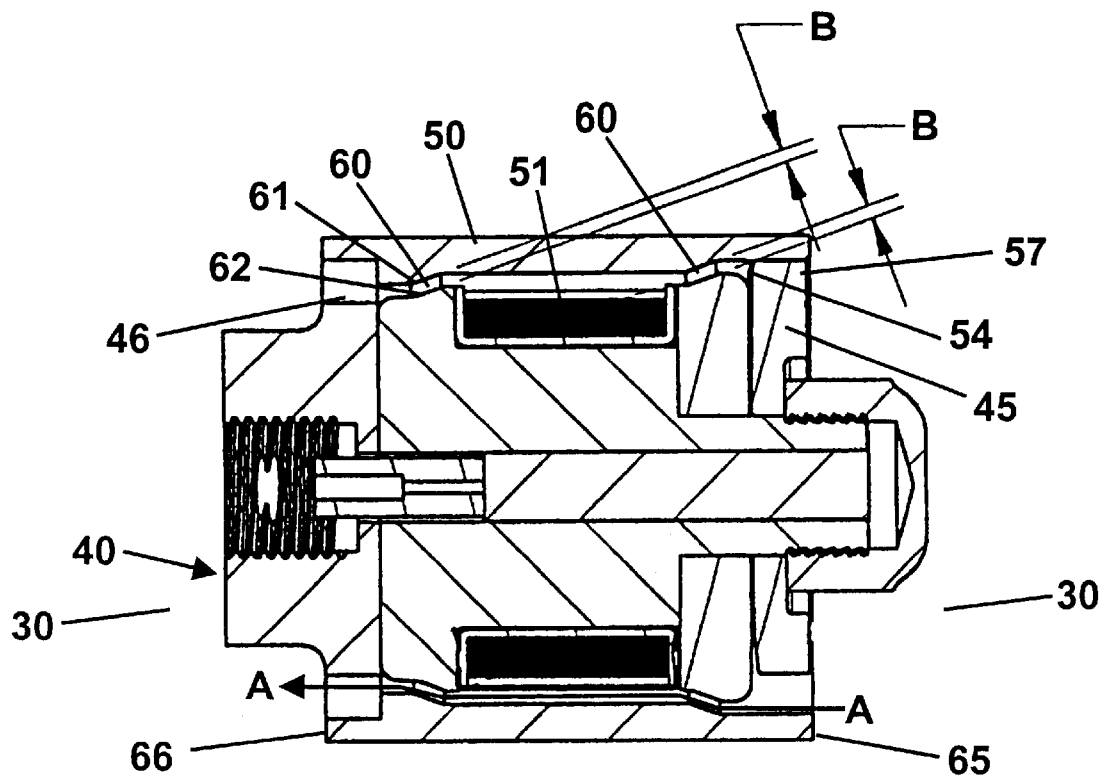
FIGS. 3A & 3B are alternate detailed cross-sectional views of the piston shown in FIG. 2.
Figure 3B:
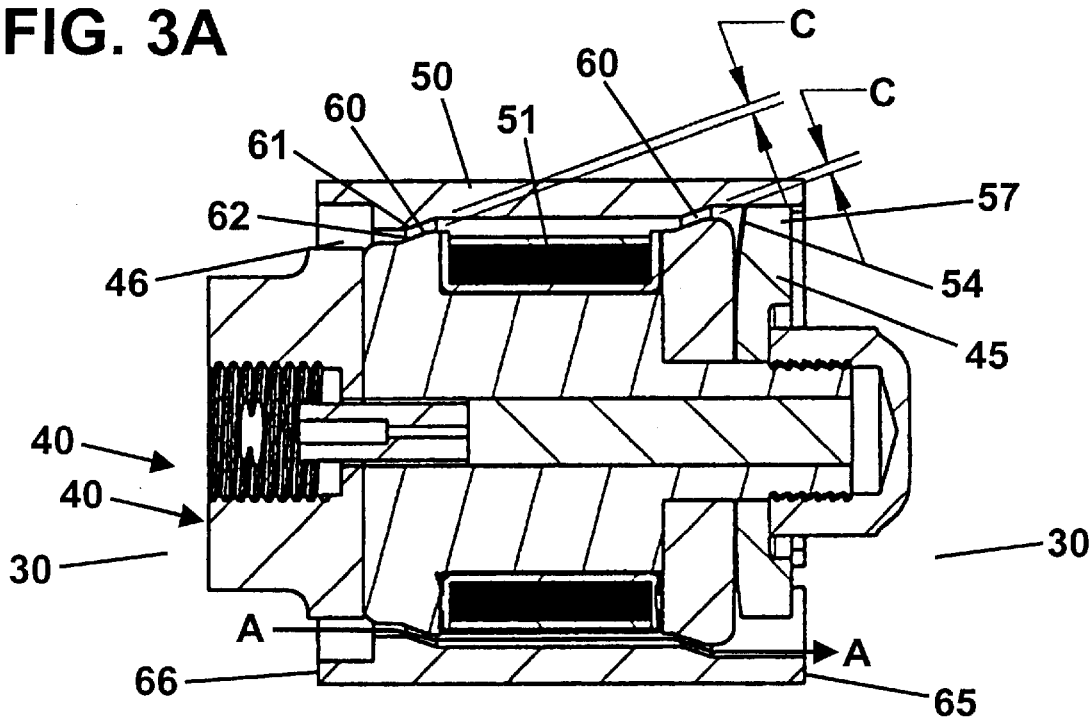

FIGS. 3A & 3B are alternate detailed cross-sectional views of the piston 40 shown in FIG. 2. Gap 60 is formed between the ring 50 and core 45 to allow fluid 30 flow along path A. In one embodiment, two gaps 60 may be formed between two pairs of ring shoulder portion 61 and a core shoulder portion 62. Shoulder portions 61, 62 provide means for varying gap 60 size based on axial movement of ring 50. Those skilled in the art will recognize that size, shape, number, and geometry of the gap(s) 60 and shoulder portion (s) 61, 62 may vary while still providing the advantages of the present invention. For example, gap 60 size may be adapted for different dampening applications, as with different vehicle weights or dampening profiles.

Coil 51 may be positioned adjacent gap 60 providing means for modulating MR fluid 30 viscosity as it flows through gap 60. Coil 51 may include one or more conductive elements, such as a metallic wire, for carrying an electric current. The electric current may be provided and controlled externally (e.g., by an electrical source and vehicle computer system) to regulate dampening force. To further regulate dampening force, gap 60 size is varied based on the axial ring 50 movement, thereby modulating fluid 30 flow. Gap 60 size may be inversely proportional to dampening force; larger gap 60 size produces smaller dampening force, and vice versa.

During a compression stroke, as shown in FIG. 3A, fluid 30 pressure on nut side 65 (e.g., first housing compartment 21 shown in FIG. 1) initially exceeds fluid 30 pressure on rod side 66 (e.g., second housing compartment 22 shown in FIG. 1). The pressure difference forces fluid 30 to flow from nut side 65 to rod side 66 along path A through gap 60, and provides means for axially moving ring 50 during damper operation. In one embodiment, the pressure difference forces ring 50 to slide axially toward the core projections 46, relative to core 45, by pushing on nut side 65 of ring 50. The fluid 30 pressure against the ring 50 may be augmented by the spring 54 force. Ring 50 continues to slide axially until contact is made with core projections 46. As the ring 50 slides toward core projections 46, gap 60 between ring shoulder portion 61 and core shoulder portion 62 increases in size to a compression dimension B. As such, fluid 30 flow increases thereby decreasing dampening force, relative to a smaller gap 60 size.

During an extension stroke, as shown in FIG. 3B, fluid 30 pressure on rod side 66 initially exceeds fluid 30 pressure on nut side 65. The pressure difference forces fluid 30 to flow from rod side 66 to nut side 65 along path A through gap 60. In one embodiment, the pressure difference forces ring 50 to slide axially toward the end ring projections 57, relative to core 45, by pushing on rod side 66 of ring 50. The fluid 30 pressure exceeds the spring 54 force resulting in spring 54 deflection. Ring 50 continues to slide axially until contact is made with end ring projections 57. As the ring 50 slides toward end ring projections 57, gap 60 between ring shoulder portion 61 and core shoulder portion 62 decreases in size to an extension dimension C. As such, fluid 30 flow decreases thereby increasing dampening force, relative to a larger gap 60 size (e.g., compression dimension B). The smaller gap 60 size during an extension stroke may increase dampening force by both narrowing the opening size and increasing the effect of the coil 51 magnetism on the MR fluid.

Using a variable gap 60 size to generate greater dampening force during extension allows external MR dampening control to be applied over a more effective range. For example, the portion of dampening forces generated from MR fluid magnetization may be used to manage finely-tuned dampening or other events requiring additional dampening force. For dampers lacking MR fluid altogether, the variable gap 60 size provides a strategy for generating greater dampening force during the extension stroke. It is important to note, however, that the invention is not limited to increased dampening force during an extension stroke. Those skilled in the art will recognize that the piston 40 geometry may be re-arranged, as by altering shoulder portions 61, 62 geometry, to provide increased dampening force during a compression stroke.

While the embodiments of the invention disclosed herein are presently considered to be preferred, various changes and modifications can be made without departing from the spirit and scope of the invention. For example, the damper assembly configuration, and dampening force characteristics are not limited to any particular design or sequence. Specifically, the gap and shoulder portion configuration, size, shape, geometry, location, and number, may vary without limiting the utility of the invention. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A vehicle damper assembly comprising:

a housing including a fluid carried therein;

a piston slidably carried in the housing, the piston including a ring and a core, wherein at least one gap to allow fluid flow is formed between the ring and core; and a rod operably attached to the piston, wherein the ring moves axially with respect to the core to vary the gap size and modulate fluid flow during operation of the assembly.

2. The assembly of claim 1 wherein the fluid comprises magnetorheological fluid.

3. The assembly of claim 1 wherein the gap is formed between at least one ring shoulder portion and at least one core shoulder portion.

4. The assembly of claim 1 wherein the gap is expanded during a compression stroke.

5. The assembly of claim 1 wherein the gap is narrowed during an extension stroke.

6. The assembly of claim 1 wherein the gap size is inversely proportional to a dampening force.

7. The assembly of claim 1 wherein the piston comprises a plurality of projections adapted to limit a ring range of motion relative to the core.

8. The assembly of claim 7 wherein at least one spring operably attached to the piston is adapted to force the ring against at least one of the projections.

9. A method for modulating fluid flow through a vehicle damper assembly, comprising:

providing a piston, slidably carried in a housing, wherein the piston comprises a ring and a core, axially moving the ring with respect to the core during assembly operation, and varying at least one gap size based on the axial movement, wherein the gap is formed between the ring and core.

10. The method of claim 9 wherein varying the gap size comprises expanding the gap during a compression stroke.

11. The method of claim 9 wherein varying the gap size comprises narrowing the gap during an extension stroke.

12. The method of claim 9 wherein the gap size is inversely proportional to a dampening force.

13. The method of claim 9 wherein axial movement of the ring comprises limiting a ring range of motion relative to the core.

14. The method of claim 9 wherein axial movement of the ring comprises forcing the ring against at least one projection.

15. A vehicle damper assembly comprising:

a piston, slidably carried in a housing, wherein the piston comprises a ring and a core, means for axially moving the ring with respect to a the core during assembly operation, and means for varying at least one gap size based on the axial movement, wherein the gap is formed between the ring and core.

* * * * *